United States Patent [19]

Morikawa

[11] Patent Number: 5,550,955
[45] Date of Patent: Aug. 27, 1996

[54] METHOD AND APPARATUS FOR DIGITALLY PROCESSING AN IMAGE BASED ON A RANDOM NUMBER AND A MULTIPLIER CORRESPONDING TO INPUT IMAGE DATA

[75] Inventor: Seiichiro Morikawa, Kaisei-machi, Japan

[73] Assignee: Fuji Photo Film Co., Ltd., Kanagawa, Japan

[21] Appl. No.: 123,572

[22] Filed: Feb. 7, 1994

[30] Foreign Application Priority Data

Feb. 8, 1993 [JP] Japan .................................. 5-020123

[51] Int. Cl.⁶ .................................................. H04N 1/387
[52] U.S. Cl. ............................................ 395/109; 358/458
[58] Field of Search .................................. 395/101, 109, 395/118, 126, 127, 129; 358/455, 458, 461, 443

[56] References Cited

U.S. PATENT DOCUMENTS

| | | | |
|---|---|---|---|
| 4,809,082 | 2/1989 | Yamaguchi et al. .................... | 358/455 |
| 4,976,805 | 12/1990 | Ishii et al. .................................. | 156/100 |
| 5,123,059 | 6/1992 | Hirosawa et al. ....................... | 382/272 |
| 5,144,456 | 9/1992 | Sauano ..................................... | 358/443 |
| 5,175,807 | 12/1992 | Cawley et al. ........................... | 395/128 |
| 5,179,528 | 1/1993 | Robertson et al. ................. | 364/715.02 |
| 5,202,773 | 4/1993 | Kato ......................................... | 358/461 |

Primary Examiner—Raymond J. Bayerl
Assistant Examiner—Gabriel I. Garcia
Attorney, Agent, or Firm—Sughrue, Mion, Zinn, Macpeak & Seas

[57] ABSTRACT

An apparatus for processing an image data digitally comprises a storage device for storing therein a multiplier varying in accordance with a first image data obtained by digitally processing the image data, the length of the integral part of the first image data being n bits, a random number generating circuit for generating a random number falling on somewhere between zero and a positive number less than unity, an arithmetic circuit for performing arithmetic operations including a multiplication of the random number by the multiplier, and an adding circuit for adding the output of the arithmetic circuit to the first image data and outputting the least significant m bits (m≦n) of the integral part of the so-added data as second image data for use in the next process.

4 Claims, 6 Drawing Sheets

5,550,955

METHOD AND APPARATUS FOR DIGITALLY PROCESSING AN IMAGE BASED ON A RANDOM NUMBER AND A MULTIPLIER CORRESPONDING TO INPUT IMAGE DATA

BACKGROUND OF THE INVENTION

1. Field of the Invention

This invention relates to a method and an apparatus for digitally processing an image, wherein intermediate steps of gradation in a continuous tone can be increased by a random process.

2. Description of the Related Art

An image processing system such as an image reading and reproducing system has been widely used in the printing and platemaking industries, for example, for processing image information recorded on an original or subject to be read to produce an original film plate, with an intention of simplifying the entire process and improving the quality of printed images.

In producing the original film plate suitable for a specific purpose by the above conventional image processing system, image processing regarding such as sharpness adjustment, gradation correction, color correction, trimming of an image, is effected on image data, and the processed image data is transmitted to an image output device, in which the original film plate is produced.

The conventional process referred to above has suffered, however, from a problem that in transmitting the processed image data to the image output device, shortage in the gradation steps has often developed in a high-density zone of the image, though 256 steps of gradation can be reproduced by 8 bits that a digitally processed image data may usually provide.

There has also been a problem of a tone jump (a false contour) when the number of bits of the image data is in short, since a smooth relationship between an image signal read from the original and output image data is lost.

Further, an undesirable increase in a memory capacity arises when the number of gradation steps is increased, because a halftone image is formed by comparing the output values with threshold patterns stored in the memory.

SUMMARY OF THE INVENTION

The present invention has been made to solve the above problems. It is therefore an object of the present invention to provide a method and an apparatus for processing an image digitally, wherein a smooth gradation can be represented with an image data having a lesser number of gradation steps.

According to one aspect of the present invention, for achieving the above object, there is provided a method of processing an image signal digitally, comprising steps of performing arithmetic operations including a multiplication of a random number by a multiplier, the random number falling on somewhere between zero and a positive number less than unity, the multiplier varying according to the value of a first image data obtained by digitally processing the image signal, the length of the integral part of the first image data being n bits, adding the result of the arithmetic operations to the first image data, and defining the least significant m bits (m<n) in the integral part of the result of the addition as a second image data for use in the next process.

In the above-mentioned image processing method, the expression of the arithmetic operations may be $\{t \cdot r - (t-1)/2\}$, where t is the multiplier and r is the random number.

According to another aspect of the present invention, for achieving the above object, there is provided an apparatus for processing an image signal digitally, comprising storing means for storing a multiplier, the value of the multiplier varying according to the value of a first image data obtained by digitally processing the image signal, the length of the integral part of the first image data being n bits, random number generating means for generating a random number falling on somewhere between zero and a positive number less than unity, arithmetic means for performing arithmetic operations including a multiplication of the random number by the multiplier read from the storing means in accordance with the value of the first image data, and adding means for adding the output of the arithmetic means to the first image data and defining the least significant m bits (m<n) in the integral part of the result of the addition to be a second image data for use in the next process.

In the above image processing apparatus, the arithmetic means may perform the arithmetic operations expressed by $\{t \cdot r - (t-1)/2 \}$, where t is the multiplier and r is the random-number.

The method of the invention is applied once to each pixel density data read by a CCD element, A/D converted to a digital data, and having a discrete value. As a result, a variation is introduced into each of the input pixel data by the addition of a random number. The pixel data accompanied by the variation is then rounded off, and takes randomly either one of integer values within the range of the variation.

The center value of the variation is set to be equal to the input pixel data value, including the effect of the rounding-off. The range of the variation is controlled according to the values of the multiplier. The values of the multiplier are decided beforehand corresponding to the respective input pixel data values, and stored in the memory unit. Therefore, the invented method can be selectively applied to a desired density range, eg, an extremely high density range.

The number of output data bits m is chosen as being smaller than that of input data bits n. This is the case that the number of data bits in the image output device is smaller than that of the image reading and processing device.

Even when the pixel data processed by the invented method are reproduced into a picture by such an image output device having a reduced data bits, that picture is observed as if intermediate gradation steps are inserted in addition to the original gradation steps represented by the input digital pixel data, due to the variation added thereto. As a result, the tone-jump is suppressed from occurring.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 7A represents the number of bits of an image data inputted to an arithmetic circuit, FIG. 7B the number of bits of an image data outputted from the arithmetic circuit, and FIG. 7C the number of bits of an image data outputted from an adder.

DETAILED DESCRIPTION OF THE PREFERRED EMBODIMENTS

A method and an apparatus for processing an image digitally according to the present invention will be described in detail with reference to the accompanying drawings in which a preferred embodiment is shown by way of illustrative example.

Figure 3:
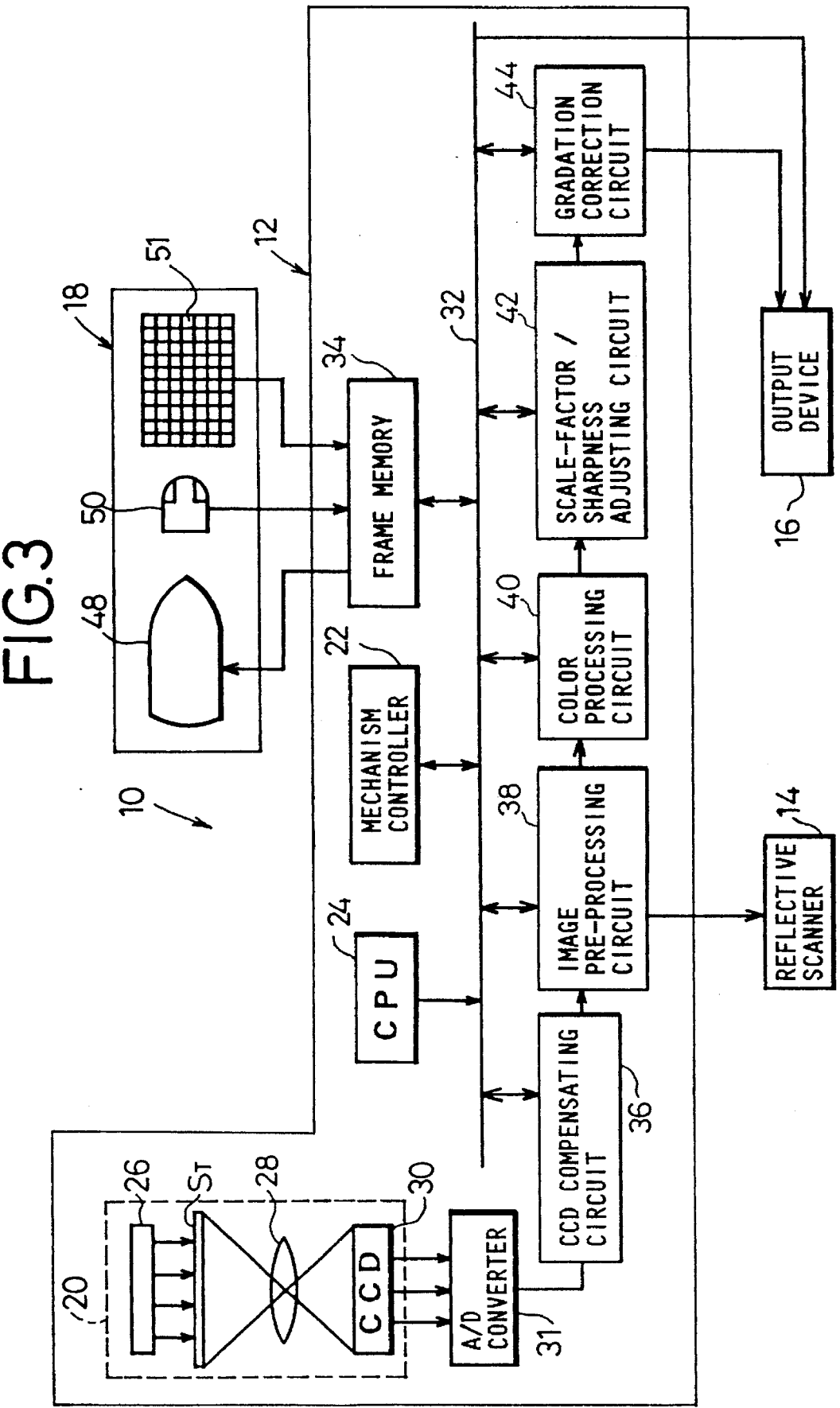
FIG. 3 is a block diagram showing the structure of an image processing system to which the method and apparatus of to the present invention are applied.

FIG. 3 shows an image reading, recording and reproducing system 10 serving as an image processing system to which a method and an apparatus for processing an image according to the present invention are applied. The image reading, recording and reproducing system 10 comprises a transmissive scanner 12 for scanning or reading image information recorded on a transmissive original such as a film, a reflective scanner 14 for scanning or reading image information recorded on a reflective original such as a photograph, an image output device 16 for outputting the image information read by either the transmissive scanner 12 or the reflective scanner 14 therefrom so as to reproduce it on a film, and a console unit 18 for operating the transmissive scanner 12, the reflective scanner 14 and the image output device 16.

Principal components of the transmissive scanner 12 are a reading or scanning device 20 for reading image information from a transmissive original $S_T$ such as a film on which the image information has been recorded, a mechanism controller 22 for controlling the operation of a mechanism of the transmissive scanner 12 and a CPU 24 for performing the entire control and the control for a gradation correcting process which will be described later. The scanning device 20 comprises an illuminating light source 26 for applying illuminating light to the transmissive original $S_T$, a condenser lens 28 for concentrating the illuminating light transmitted through the transmissive original $S_T$ and a CCD unit 30 for converting the illuminating light transmitted through the condenser lens 28 into an electric signal. Incidentally, the CCD unit 30 generates image signals separated into three primary colors of R, G and B in response to the illuminating light and outputs them to an A/D converter 31.

The mechanism controller 22 and the CPU 24 are connected to a system bus 32. A frame memory 34, a CCD compensating circuit 36, an image pre-processing circuit 38 inputted with an output produced from the reflective scanner 14, a color processing circuit 40, a scale-factor/sharpness adjusting circuit 42, a gradation correction circuit 44 are respectively connected to the system bus 32. The frame memory 34 temporarily stores image information read by the scanning device 20 therein and supplies the image information to a CRT display unit 48. Further, the console unit 18 has a mouse 50 and an input port of a keyboard 51.

The CCD compensating circuit 36, the image preprocessing circuit 38, the color processing circuit 40, the scale-factor/sharpness adjusting circuit 42 and the gradation correction circuit 44 respectively have the following functions under the control of the CPU 24.

The CCD compensating circuit 36 has a function of effecting such as an on-darkness correction, a shading correction, attributable to the output of the CCD unit 30 on image data supplied from the A/D converter 31. The image pre-processing circuit 38 has a function of converting data outputted from the CCD compensating circuit 36 into a concentration or density value of the inside of the scanner and selecting either of a transmissive input or a reflective input. Further, the color processing circuit 40 has a function of effecting a desired color process on the image data based on image processing conditions. The scale-factor/sharpness adjusting circuit 42 has a function of effecting a scale-factor and sharpness adjustment process on the image data.

Figure 1:
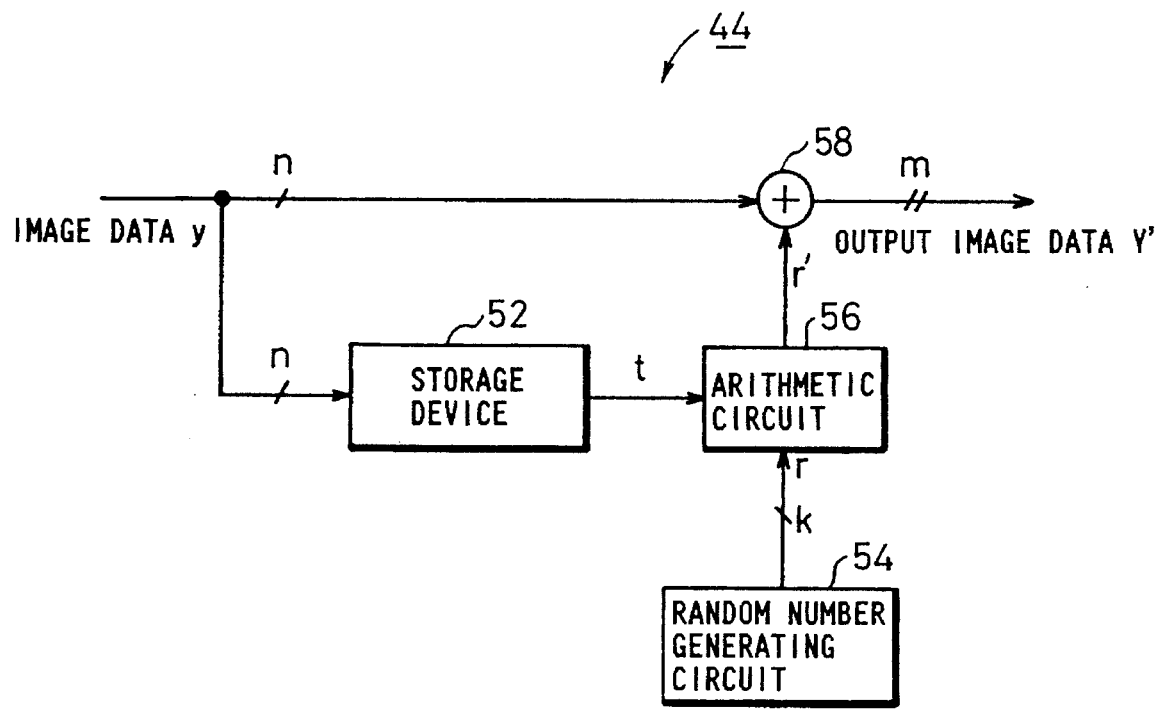
FIG. 1 is a block diagram showing the structure of a gradation correction circuit employed in one embodiment of the present invention.

As shown in FIG. 1 gradation correction circuit 44 comprises a storage device 52 for storing a multiplier t ($\geq 1$) so that the values of which correspond to respective density values of an image data y, the data length of which is n bits, under the control of the CPU 24, a random number generating circuit 54 for generating a random number r ($0 \leq r < 1$) whose data length is k bits, an arithmetic circuit 56 for performing arithmetic operations between the random-number r and the multiplier t, and an adder 58 for adding the image data y to a data r' outputted from the arithmetic circuit 56 and transmitting the least significant m bits (m<n) of the integral part of the result of the addition as an output Y' to the image output device 16.

Here, the arithmetic circuit 56 and the adder 58 may be constructed by the CPU 24.

Figure 2:
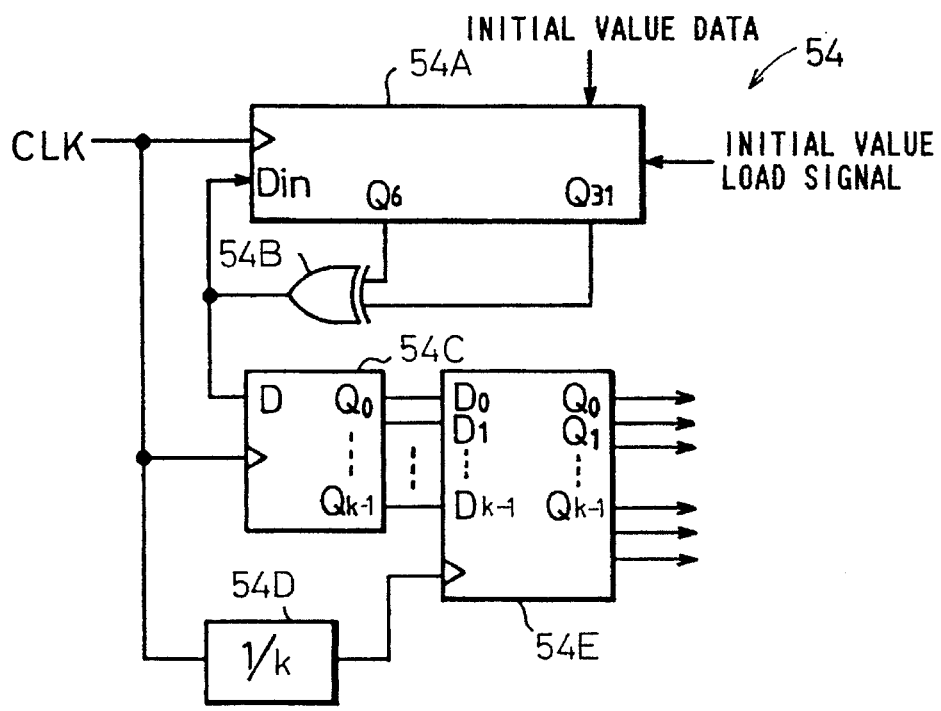
FIG. 2 is a block diagram showing the structure of a random number generating circuit in the gradation correction circuit shown in FIG. 1.

As shown in FIG. 2, the random number generating circuit 54 comprises a 32-stage shift register 54A for placing therein initial value data upon generation of an initial value load signal under the control of the CPU 24, an exclusive-OR circuit 54B for performing a mod-2 addition of an output produced from the sixth stage in the shift register 54A and an output produced from the thirty-first stage corresponding to the final stage and inputting the output or the result of addition to the shift register 54A, a k-bit shift register 54C for receiving the output of the exclusive-OR circuit 54B as an input and converting it into k-bit parallel data, a frequency divider 54D for frequency-dividing a clock pulse by k, and a latch circuit 54E for receiving the output of the frequency divider 54D therein as a strobe pulse and latching the outputs of the k-bit shift register 54C therein. The random number generating circuit 54 collects k pieces of one-bit random numbers produced in a 32-bit cycle and generates a k-bit uniform random number E therefrom.

Figure 4:
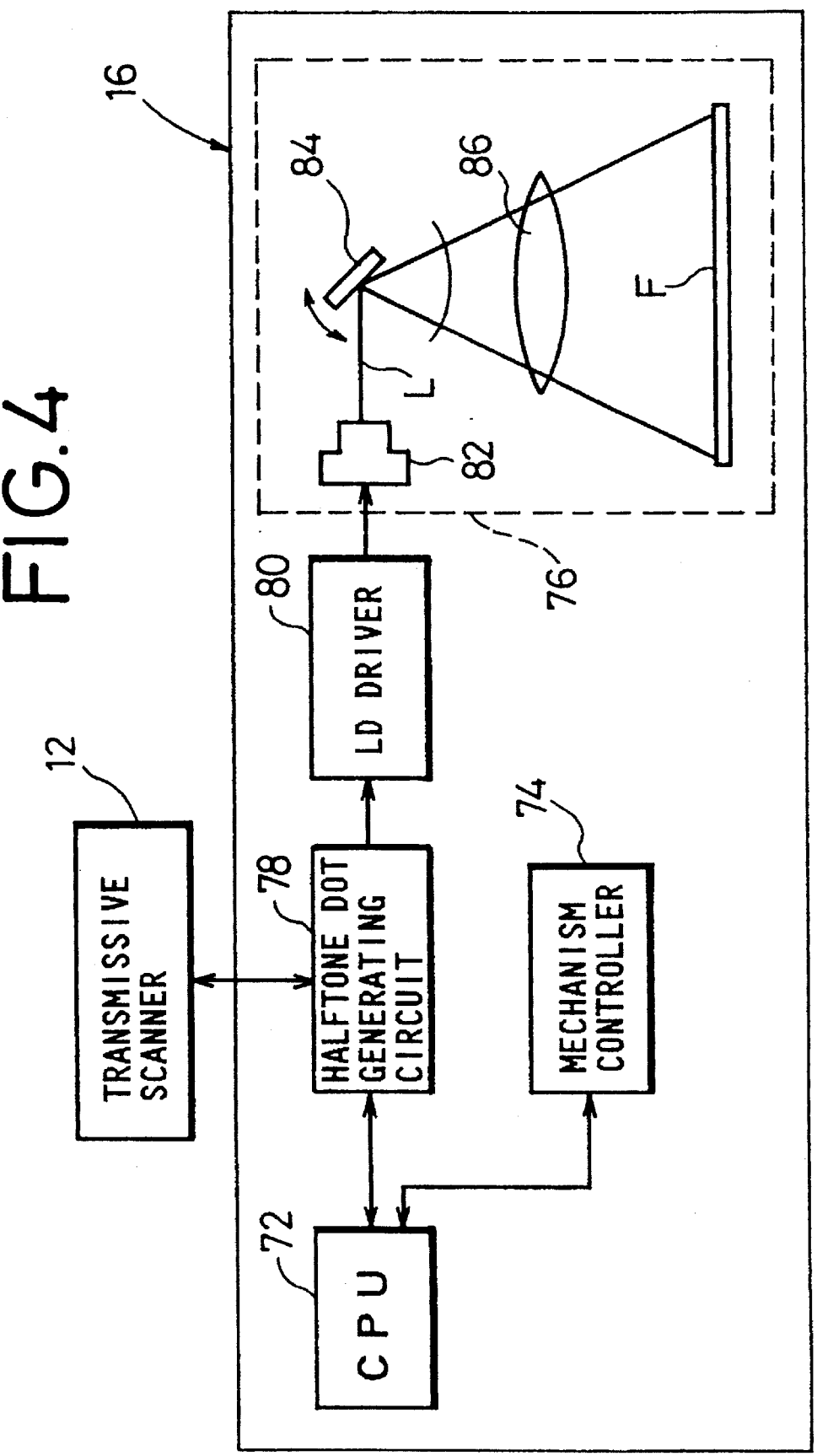
FIG. 4 is a block diagram showing the structure of an image output device of the image processing system shown in FIG. 3.

FIG. 4 is a block diagram showing the structure of the image output device 16. The image output device 16 comprises a CPU 72 for controlling the entire operation of the image output device 16, a mechanism controller 74 for controlling the operation of a mechanism of the image output device 16 and a recorder 76 for recording image information on a film F.

A halftone dot generating circuit 78 is connected to the CPU 72, which generates a halftone dot signal from the image data subjected to the gradation correction by the gradation correction circuit 44 and supplies it to an LD driver 80. The LD driver 80 activates a laser diode 82 of the recorder 76 based on the halftone dot signal. The recorder 76 comprises the laser diode 82, a light deflector 84 for deflecting and scanning a laser beam L in a main scanning direction and a condenser lens 86 for concentrating the deflected laser beam L on the film F.

The image reading, recording and reproducing system 10 including the gradation correction circuit 44, employed in the present embodiment is basically constructed as described above, and the operation thereof will next be described.

The operations of the image reading, recording and reproducing system 10 excluding the gradation correction circuit 44 are identical to those of the conventional system. When a film original plate for a specific purpose is produced, a so-called pre-scan for roughly reading image information from an original is first carried out, to establish the most suitable image processing conditions for such as sharpness adjustment, gradation correction, color correction or trimming of the image. Then, the image information is read again under the image processing conditions set as above, and the resultant image data is processed by the gradation correction circuit 44, and outputted to the image output device 16 to obtain therein the film original plate.

The operation of the gradation correction circuit 44 will next be described.

Figure 5B:
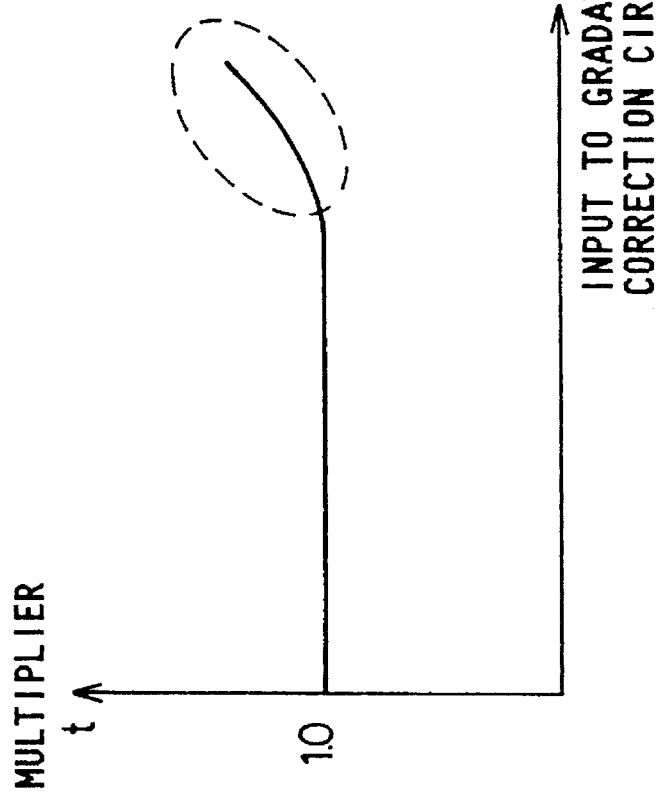
FIGS. 5A and 5B are respectively typical characteristic charts for describing values of a multiplier stored in a storage device in the gradation correction circuit shown in FIG. 1.
Figure 5A:
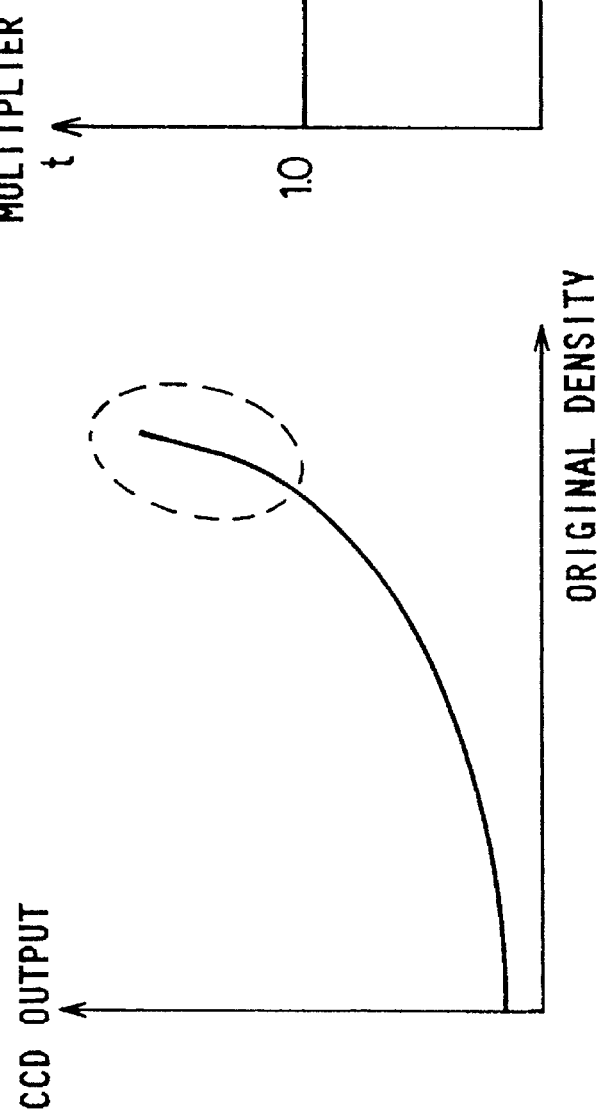
Figure 6A:
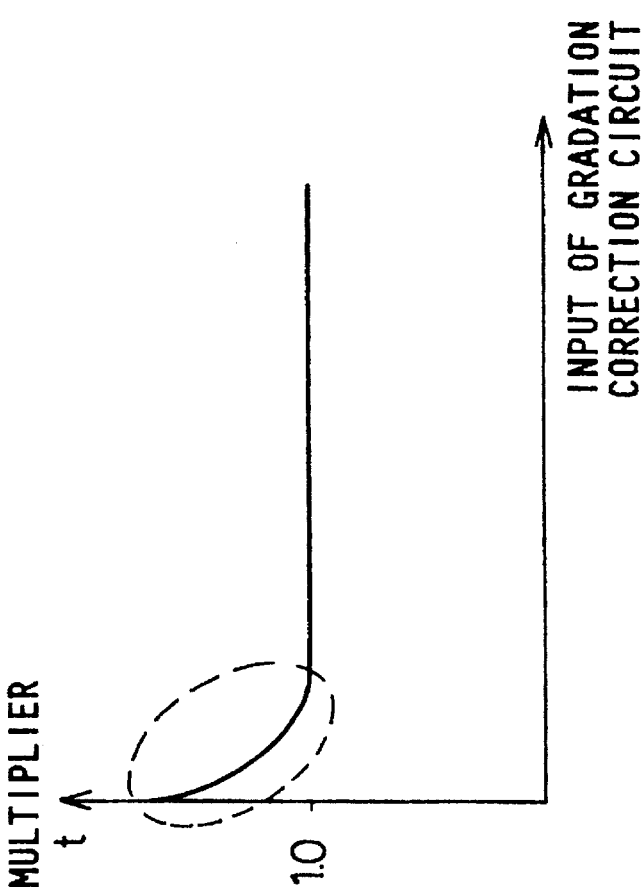
FIGS. 6A and 6B are respectively typical characteristic charts for explaining values of the multiplier stored in the storage device in the gradation correction circuit shown in FIG. 1.
Figure 6B:
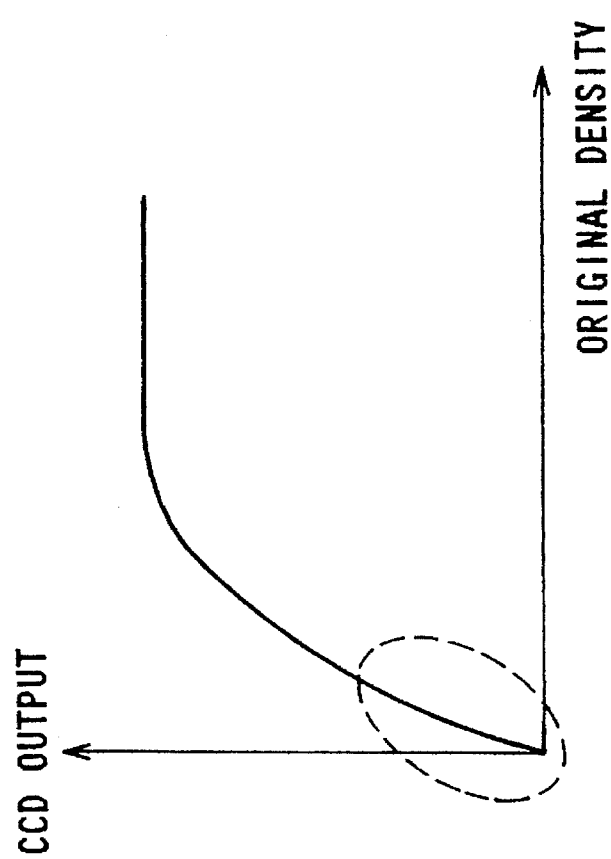

A density vs output characteristic of the transmissive scanner 12, before the gradation correction by the gradation correction circuit 44, is shown in FIG. 5A by way of example and, similarly, that of the reflective scanner 14 is shown in FIG. 6A. With these density vs output characteristics, a tone jump is significantly developed in the zones surrounded by the broken line in FIGS. 5A and 6A. Therefore, a multiplier t having a characteristic shown in FIG. 5B is prepared and stored in the storage device 52 in the case of the characteristic curve shown in FIG. 5A, to correct the above zone where the tone jump is developed. Similarly, a multiplier t having another characteristic shown in FIG. 6B is stored in the storage device 52 in the case of the characteristic shown in FIG. 6A.

Now, assume that the image data y inputted to the gradation correction circuit 44 is expressed as follows:

$$y = g_I + g_F \quad (1)$$

where $g_I$ represents the integral part, and $g_F$ the decimal part of y ($0 \leq g_F < 1$).

The multiplier t is read from the storage device 52 based on the image data y inputted to the gradation correction circuit 44.

Then, the arithmetic circuit 56 performs arithmetic operations based on the random-number r generated from the random number generating circuit 54 and the multiplier t so as to produce output data r' given by the following equation:

$$r' = t \cdot r - (t-1)/2 \quad (2)$$

where the multiplier t represents a number greater than or equal to 1, and the random-number r ($0 \leq r < 1$) is a uniform random number. Therefore, the output data r' is also a uniform random number.

Assume now that the result of addition by the adder 58 is represented as y' expressed as follows:

$$y' = g_I + g_F + r' \quad (3)$$

As represented by the following equation (4), an output Y' which is the least significant m bits in the integral part of y', is sent to the image output device 16 from the adder 58. In the equation (4), [y'] is the Gaussian notation of y' which gives an integer not greater than y'.

$$Y' = [y'] \quad (4)$$

When a multiplier t greater than or equal to 2 is selected, for example, the image data Y' transmitted to the image output device 16 takes either one of at least three values: the input image data value incremented by +1; that incremented by 0; or that incremented by −1. That is, the value of the transmitted image data Y' is scattered to either one of at least the above three levels with an equal probability by the effect of the uniform random number r. Thus, the widths between gradation steps in the image data Y' become seemingly narrower than those of the image data y, and the resolution is apparently enhanced. This is because the expected value can be set equal to y by the operations of $r' = \{t \cdot r - (t-1)/2\}$.

An increase in the resolution will be briefly described below. When 99 and 100 are generated with a ½ probability for each, for example, this is statistically equivalent to that an intermediate number 99.5 is derived. It is thus understood that the width between the gradation steps is narrowed and the resolution apparently increases. Lost or reduced levels more than two levels can be restored in the output characteristics due to an increase in the number of selectable levels of density data.

Figure 7A:
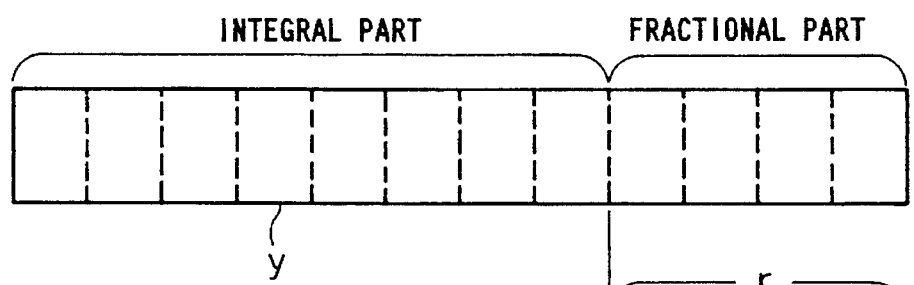
FIGS. 7A, 7B and 7C are schematic diagrams for explaining arithmetic operations performed in the gradation correction circuit shown in FIG. 1.
Figure 7B:
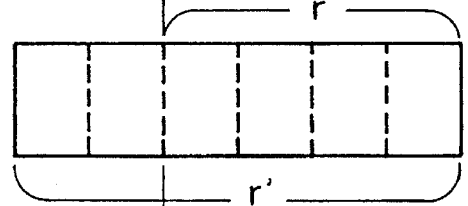

A numerical example is given as follows. An image data y illustrated in FIG. 7A has 8 bits as the integral part and 4 bits as the decimal (fractional) part. Assume now that its decimal value is 120.1875. A multiplier t whose decimal value is 2 is read from the storage device 52 in accordance with the image data y, and multiplied by a random number r generated by the random number generating circuit 54, whose decimal value falls on somewhere between 0 and 0.9375. This multiplication results in an output data r' having 2 bits as the decimal part and 4 bits as the fractional part, whose decimal value falls on somewhere between −0.5(= 2×0−½ and 1.3750 (=2×0.9375−½).

Figure 7C:
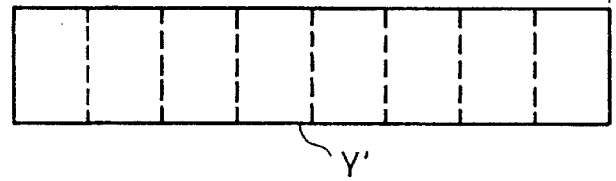

The addition of the image data y with the output data r' yields a value falling on somewhere between 119.6875 and 121.5625. If 8 bits of the integral part of the result of the adder 58 is outputted therefrom as illustrated in FIG. 7C, the 8-bit data falls on either of 119, 120 or 121 as a decimal number with an equal probability. Thus, the number of the gradation steps around the decimal value 120.1875 has been increased from one to three, and this brings about an increase in the resolution of the image.

Next, it is demonstrated in the following that the expected value of the image data Y' outputted to the image output device 16 from the gradation correction circuit 44 is set identical to the value of the image data y inputted to the gradation correction circuit 44.

Possible values of the output data r' outputted from the arithmetic circuit 56 as is given by the following equation:

$$-(t-1)/2 \leq r' < t - (t-1)/2 \quad (5)$$

Let $\alpha_I$ be the integral part and $\alpha_F$ the fractional part ($0 \leq \alpha_F < 1$) then, the left-hand side term of the above equation (5) is represented as follows:

$$-(t-1)/2 = \alpha_I + \alpha_F \quad (6)$$

In this condition, the range of values that the image data y' can take is given by the following equation:

$$g_I + g_F + \alpha_I + \alpha_F \leq y' < g_I + g_F + \alpha_I + t + \alpha_F \quad (7)$$

When (A); $(g_F+\alpha_F<1)$, the image data Y' is given by:

$$Y' = \begin{cases} g_I+\alpha_I & \text{probability } 1/t \cdot (1-g_F-\alpha_F) \\ g_I+\alpha_I+1 & \text{probability } 1/t \\ \cdot & \cdot \\ \cdot & \cdot \\ \cdot & \cdot \\ g_I+\alpha_I+t-1 & \text{probability } 1/t \\ g_I+\alpha_I+t & \text{probability } 1/t \cdot (g_F+\alpha_F) \end{cases} \quad (8)$$

The expected value of the image data Y' is given by:

$$\begin{aligned} E(Y') &= (g_I+\alpha_I)\cdot 1/t \cdot (1-g_F-\alpha_F) + \\ &\quad 1/t \cdot \sum_{K=1}^{t-1}(g_I+\alpha_I+K) + \\ &\quad (g_I+\alpha_I+t)\cdot 1/t \cdot (g_F+\alpha_F) \\ &= g_I+g_F+\alpha_I+\alpha_F+(t-1)/2 \end{aligned} \quad (9)$$

Since the following equation (10) is established, the expected value E (Y') is rewritten as follows:

$$\alpha_I+\alpha_F=-(t-1)/2 \quad (10)$$

$$E(Y')=g_I+g_F=y \quad (11)$$

When (B); $(g_F+\alpha_F \geq 1)$, the image data Y' is given by:

$$Y' = \begin{cases} g_I+\alpha_I+1 & \text{probability } 1/t \cdot (2-g_F-\alpha_F) \\ g_I+\alpha_I+2 & \text{probability } 1/t \\ \cdot & \cdot \\ \cdot & \cdot \\ \cdot & \cdot \\ g_I+\alpha_I+t & \text{probability } 1/t \\ g_I+\alpha_I+t+1 & \text{probability } 1/t \cdot (g_F+\alpha_F-1) \end{cases} \quad (12)$$

Thus, the expected value E(Y') of the image data Y' is determined in accordance with the following equation:

$$\begin{aligned} E(Y') &= (g_I+\alpha_I+1)\cdot 1/t \cdot (2-g_F-\alpha_F) + \\ &\quad 1/t \cdot \sum_{K=2}^{t}(g_I+\alpha_I+K) + \\ &\quad (g_I+\alpha_I+t+1)\cdot 1/t \cdot (g_F+\alpha_F-1) \\ &= g_I+g_F+\alpha_I+\alpha_F+(t-1)/2 \end{aligned} \quad (12)$$

Since the following equation (14) is established, the expected value E(Y') of the image data Y' is rewritten as follows:

$$\alpha_I+\alpha_F=-(t-1)/2 \quad (14)$$

$$E(Y')=g_I+g_F=y \quad (15)$$

Even when either of (A) and (B) is used, the expected value of the image data Y' becomes equal to the image data y. Hence, the resolution is statistically enhanced without giving any change to the image. As a result, the tone jump is suppressed from occurring.

Having now fully described the invention, it will be apparent to those skilled in the art that many changes and modifications can be made without departing from the spirit or scope of the invention as set forth herein.

What is claimed is:

1. A method of processing an image signal digitally, comprising steps of:

inputting and digitizing an image signal, representing an image, to provide first image data having a length of n bits;

reading a multiplier from a storage device in accordance with the value of said first image data, a value of said multiplier varying according to the value of the first image data;

performing arithmetic operations including a multiplication of a random number by said multiplier, said random number having a value equal to or greater than zero and less than unity;

adding the result of said arithmetic operations to said first image data; and defining m bits (m<n) of the integral part of the result of said addition as second image data, representing said image, for use in a next process.

2. A method according to claim 1, wherein the expression of said arithmetic operations is given by $\{t\cdot r -(t-1)/2\}$, where t is said multiplier and r is said random number.

3. An apparatus for processing an image signal digitally, comprising:

storing means for storing a multiplier, said multiplier varying according to the value of a first image data obtained by digitally processing said image signal, the length of said first image data being n bits;

random number generating means for generating a random number having a value equal to or greater than zero and less than unity;

means for reading said multiplier from said storing means in accordance with the value of said first image data;

arithmetic means for performing arithmetic operations including a multiplication of said random number by said multiplier read from said storing means; and adding means for adding the output of said arithmetic means to said first image data and defining the m bits (m<n) of the integral part of the result of said adding means as second image data for use in a next process.

4. An apparatus according to claim 3, wherein said arithmetic means performs arithmetic operations expressed by $\{t\cdot r-(t-1)/2\}$, where t is said multiplier and r is said random number.

* * * * *

UNITED STATES PATENT AND TRADEMARK OFFICE
CERTIFICATE OF CORRECTION

PATENT NO. : 5,550,955
DATED : August 27, 1996
INVENTOR(S) : Seiichiro Morikawa

It is certified that error appears in the above-indentified patent and that said Letters Patent is hereby corrected as shown below:

On the title page, item [21], "123,572" should read -- 193,572 --.

Signed and Sealed this

Fourth Day of February, 1997

Attest:

BRUCE LEHMAN

Attesting Officer

Commissioner of Patents and Trademarks